US007935264B2

(12) United States Patent
Nozu et al.

(10) Patent No.: US 7,935,264 B2
(45) Date of Patent: May 3, 2011

(54) LIQUID DISCHARGE HEAD AND METHOD OF MANUFACTURING THE SAME

(75) Inventors: Satoshi Nozu, Ebina (JP); Tatsuo Furuta, Kawasaki (JP); Takehito Nishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 840 days.

(21) Appl. No.: 11/847,891

(22) Filed: Aug. 30, 2007

(65) Prior Publication Data

US 2008/0062230 A1 Mar. 13, 2008

(30) Foreign Application Priority Data

Sep. 8, 2006 (JP) ................................ 2006-243986

(51) Int. Cl.
*G01D 15/00* (2006.01)
*G11B 5/127* (2006.01)

(52) U.S. Cl. ............................ 216/27; 438/21; 29/890.1

(58) Field of Classification Search .................... 216/27; 438/21; 29/890.1
See application file for complete search history.

(56) References Cited

U.S. PATENT DOCUMENTS

| | | | | |
|---|---|---|---|---|
| 6,256,849 | B1 * | 7/2001 | Kim | 29/25.35 |
| 6,639,340 | B1 | 10/2003 | Qui et al. | 310/358 |
| 2002/0080213 | A1 * | 6/2002 | Shimada et al. | 347/68 |

FOREIGN PATENT DOCUMENTS

| | | |
|---|---|---|
| JP | 9-277519 | 10/1997 |
| JP | 11-78011 | 3/1999 |
| JP | 2000-357826 | 12/2000 |

* cited by examiner

*Primary Examiner* — Roberts Culbert
(74) *Attorney, Agent, or Firm* — Fitzpatrick, Cella, Harper & Scinto

(57) ABSTRACT

A liquid discharge head includes a plurality of liquid chambers for pressurizing a liquid, the plurality of liquid chambers communicating with discharge ports respectively; and a plurality of piezoelectric elements provided in correspondence with the plurality of liquid chambers, respectively, the plurality of piezoelectric elements each including a lower electrode, a piezoelectric body film, and an upper electrode which are sequentially laminated in the stated order from the plurality of liquid chambers side. The lower electrode is provided up to a region corresponding to a portion between the plurality of liquid chambers. The piezoelectric body film is reduced in thickness at the region corresponding to the portion between the plurality of liquid chambers relative to the thickness of a region corresponding to the plurality of liquid chambers and completely covers at least the lower electrode provided to the region corresponding to the portion between the plurality of liquid chambers.

4 Claims, 5 Drawing Sheets

LIQUID DISCHARGE HEAD AND METHOD OF MANUFACTURING THE SAME

BACKGROUND OF THE INVENTION

1. Field of the Invention

The present invention relates to a liquid discharge head including a discharge port for discharging a liquid as droplets, an individual liquid chamber communicating with the discharge port, and a piezoelectric body provided in correspondence with the individual liquid chamber, and a method of manufacturing the same. The liquid discharge head according to the present invention is applicable to an ink jet recording head for making prints on paper, cloth, leather, unwoven fabric, an over head projector (OHP) sheet, or the like, a patterning device or a coating applicator for attaching a liquid to a solid object such as a substrate or a plate material. Hereinbelow, the ink jet recording head is described as a representative example of the liquid discharge head.

2. Description of the Related Art

The ink jet recording device has an advantage in its capability of easily making prints in colors with high recording quality at high recording rate. The ink jet recording device further has many excellent advantages of being able to make prints on plain paper and capable of being reduced in size with ease. Because of having those advantages, the ink jet recording device is used as an image recording device such as a printer or a facsimile machine.

Examples of the ink jet recording device include an ink jet recording device which uses an ink jet head having an orifice plate for discharging a liquid. The orifice plate includes a flow path substrate provided with a flow path of a liquid, an individual liquid chamber provided to a first surface of the flow path substrate, a through path provided to pass through from the individual liquid chamber to a second surface of the flow path, and a discharge port which is bonded to the second surface of the flow path and communicates with the through path.

To discharge ink droplets, it is necessary to increase a pressure inside the individual liquid chamber. Examples of a pressure generating unit for generating the pressure include a pressure generating unit of bubble type, in which a heat generator provided inside the individual liquid chamber generates bubbles in a liquid, to thereby discharge the liquid as liquid droplets. Examples of the pressure generating unit also include a pressure generating unit of piezoelectric type in which a vibrating plate forming a part of the individual liquid chamber is deformed by a piezoelectric element to thereby form liquid droplets and a pressure generating unit of electrostatic type in which the vibrating plate is deformed by an electrostatic force to thereby discharge liquid droplets, which are commonly used. In the above-mentioned ink jet heads, the individual liquid chambers on the flow path substrate and pressure generation sources such as the piezoelectric elements are arranged at higher density and in larger numbers so as to attain high integration of the device, in order to meet demands of recent years for image formation in higher definition.

In order to comply with the above-mentioned demands, the above-mentioned ink jet head of piezoelectric type includes, for example, an electrode and a piezoelectric body which are formed through a film deposition technique over an entire surface of the vibrating plate, and the electrode and the piezoelectric body are processed by using a photolithographic technique so as to correspond to the individual liquid chambers. With the use of the film deposition technique and the photolithographic technique, an ink jet head having high density is attained. Also, use of a Si substrate and a metal member for the flow path substrate and the orifice plate enables to form the flow path and the discharge port with high accuracy.

In general, the piezoelectric body is provided to a position corresponding to each of the liquid discharge chambers and processed so as to have a width smaller than the width of the individual chamber. The piezoelectric body is completely removed by a film thickness thereof at a region which does not correspond to the individual liquid chamber. For processing those piezoelectric bodies, a dry etching technique using a chlorine-based gas has been introduced in recent years. According to the dry etching method, it is easy to control an etching rate and an etching shape as compared with a wet etching method which uses a fluorinated acid solution or another acid solution, which makes it easy to perform processing with high accuracy. Japanese Patent Application Laid-Open No. 2000-357826 discloses a technology for processing a layered structure of piezoelectric body elements having a Pt electrode through dry etching.

When the piezoelectric body is processed through dry etching, however, in a case of a structure disclosed in Japanese Patent Application Laid-Open No. 2000-357826 where the lower electrode is not patterned, the lower electrode functions as an etching stop layer for stopping the etching from progressing. When the piezoelectric body having the above-mentioned structure is processed, the lower electrode is also etched slightly, though it may hardly affect displacement performance or mechanical characteristics of the piezoelectric body. In particular, in a case where a Pt electrode is used as the lower electrode, a chlorine-based gas which is used for processing the piezoelectric body may also etch the surface of the Pt electrode, and the etched component of the Pt electrode may adhere to an end portion of the piezoelectric body thus processed. In the case where a metal adheres to an end portion of the piezoelectric body as described above, there arises a problem that the adhesion of metal may lead to a short-circuit between the upper and lower electrodes and a breakage of the piezoelectric body thin film.

Also, in a case where the lower electrode in the proximity of the piezoelectric body thin film which serves as a driving portion is exposed, there arises a problem that the upper and lower electrodes are short-circuited and the electrodes or the piezoelectric body thin film are damaged during operation.

SUMMARY OF THE INVENTION

The present invention has been made in view of the above, and therefore, it is an object of the invention to provide a liquid discharge head and a method of manufacturing the same capable of preventing the upper and lower electrodes from being short-circuited and a piezoelectric body thin film from being damaged.

In order to attain the above-mentioned object, the present invention provides a liquid discharge head including: a plurality of liquid chambers for pressurizing a liquid, the plurality of liquid chambers communicating with discharge ports, respectively; and a plurality of piezoelectric elements provided in correspondence with the plurality of liquid chambers, respectively, the plurality of piezoelectric elements each including a lower electrode, a piezoelectric body film, and an upper electrode which are sequentially laminated in the stated order from the plurality of liquid chambers side, the lower electrode being provided up to a region corresponding to a portion between the plurality of liquid chambers, in which the piezoelectric body film is reduced in thickness at the region corresponding to the portion between the plurality of liquid chambers than at a region corresponding to the plurality of liquid chambers and completely covers at least the lower electrode provided to the region corresponding to the portion between the plurality of liquid chambers.

The present invention also provides a method of manufacturing a liquid discharge head including: a plurality of liquid chambers for pressurizing a liquid, the plurality of liquid chambers communicating with discharge ports, respectively; and a plurality of piezoelectric elements provided in correspondence with the plurality of liquid chambers, respectively, the plurality of piezoelectric elements each including a lower electrode, a piezoelectric body film, and an upper electrode which are sequentially laminated in the stated order from the plurality of liquid chambers side, the lower electrode being provided to a region corresponding to a portion between the plurality of liquid chambers, the piezoelectric body film completely covering at least the lower electrode provided to the region; the method of manufacturing a liquid discharge head including: forming a material film for forming the piezoelectric body film on the lower electrode; and etching the material film at the region corresponding to a portion between the plurality of liquid chambers such that the material film is reduced in thickness at the region corresponding to a portion between the plurality of liquid chambers than at a region corresponding to the plurality of liquid chambers.

As described above, according to the present invention, part of the piezoelectric body thin film exists on the lower electrode, and therefore it is possible to prevent the lower electrode from being etched in the etching processing and the etched component of the lower electrode from adhering to the edge portion of the piezoelectric body thin film. Also, according to the present invention, the lower electrode is covered by part of the piezoelectric body thin film, which prevents the upper and lower electrodes from being short-circuited and the piezoelectric body thin film from being damaged.

Further features of the present invention will become apparent from the following description of exemplary embodiments with reference to the attached drawings.

DESCRIPTION OF THE EMBODIMENTS

In the following, specific embodiments of the present invention will be described with reference to the accompanying drawings.

First Embodiment

Figure 1:
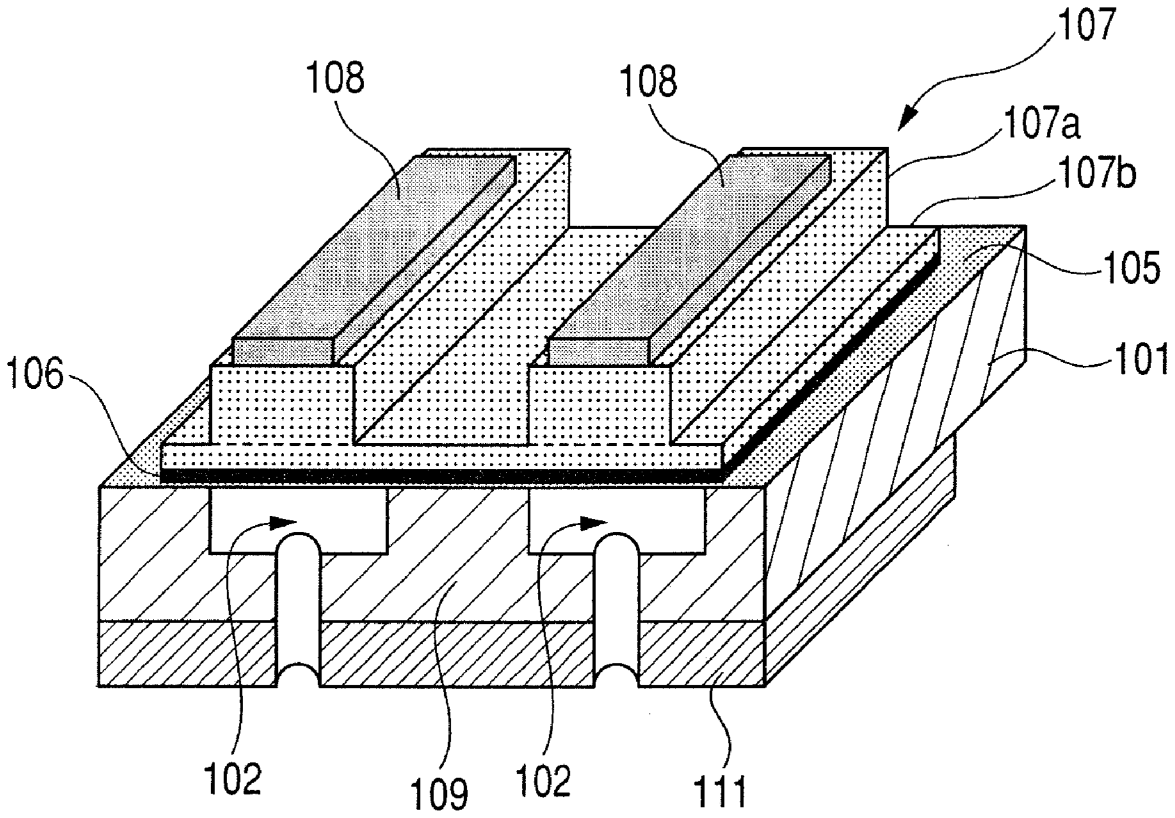
FIG. 1 is a perspective view illustrating a structure of an ink jet head according to a first embodiment of the present invention.

As shown in FIG. 1, an ink jet head according to a first embodiment includes an orifice plate 111 having a discharge port for discharging ink and a Si substrate 101 bonded to the orifice plate 111. The Si substrate 101 includes a plurality of individual liquid chambers 102 which communicate with the discharge port and apply pressure to ink, and a partition wall 109 for isolating each of the individual liquid chambers 102.

The ink jet head also includes a vibrating plate 105 formed on the individual liquid chambers 102 and a piezoelectric element serving as a pressure generator unit for displacing the vibrating plate 105. The piezoelectric element is provided on the vibrating plate 105, and formed by including a lower electrode 106, a piezoelectric body film (hereinafter, also referred to as "piezoelectric body thin film", but the present invention is not limited to a "thin film") 107, and an upper electrode 108 which are sequentially laminated on the vibrating plate 105 in the stated order.

The piezoelectric body thin film 107 is formed of regions corresponding to centers of the individual liquid chambers 102 and a region corresponding to the partition wall 109. The film thickness of the piezoelectric body thin film 107 at the region corresponding to the partition wall 109 is reduced to be smaller than the film thickness at the regions corresponding to the centers of the individual liquid chambers 102.

In the ink jet head according to this embodiment, deformation of the piezoelectric body thin film 107 integrally deforms the vibrating plate 105, to thereby allow ink in the individual liquid chambers 102 to accurately fly out from the discharge port.

A method of manufacturing the ink jet head structured as described above will be described.

Figure 2:
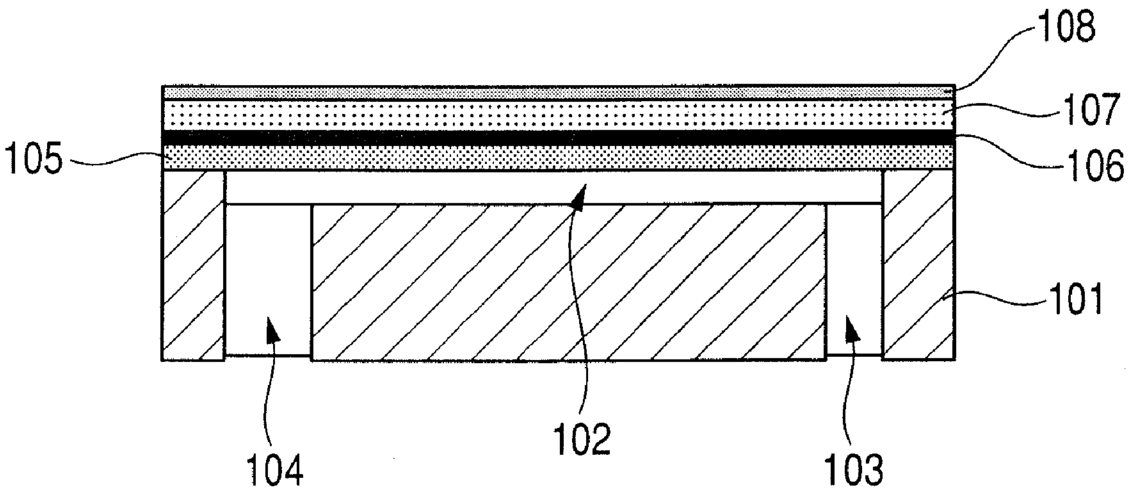
FIG. 2 is a longitudinal sectional view illustrating a piezoelectric body thin film deposited on a Si substrate in the ink jet head according to the first embodiment.

As shown in FIG. 2, a flow path such as the individual liquid chamber 102 is formed by using a Si substrate 101 of 200 μm in thickness. In this embodiment, an oxide film of 1 μm in thickness is used as an etching mask, and an inductively coupled plasma (ICP) etching device, which is known for a deep reactive ion etching (DRIE) technology for Si, is used.

First, after forming the etching mask for the individual liquid chamber 102 on a surface of the Si substrate 101, individual liquid chamber 102 of 100 μm in depth is formed through ICP etching. The individual liquid chamber 102 is 3 mm in a longitudinal direction thereof.

Next, on a reverse side of the Si substrate 101, etching masks for patterning a nozzle communicating port 103 and a common liquid chamber 104 are formed, and the nozzle communicating port 103 and the common liquid chamber 104 of 100 μm in depth are formed by using the ICP etching device.

After the processing of the Si substrate 101, the vibrating plate 105 is formed on a surface of the Si substrate 101 so as to cover the individual liquid chamber 102. According to this embodiment, the vibrating plate 105 is obtained by anodically bonding SD-2 glass (manufactured by HOYA Corporation: registered trademark) to the Si substrate 101, which is then subjected to polishing and wet etching, to thereby form the vibrating plate 105 of about 5 μm in thickness.

Then, on the vibrating plate 105, a Pt film of 300 nm in thickness is formed through a film deposition method as the lower electrode 106. On the lower electrode 106, the piezoelectric body thin film 107 is deposited. As for the piezoelectric body thin film 107, a Pb(Zr, Ti)O3 perovskite oxide (hereinafter, referred to as PZT) film formed of lead, titanium, and zirconium is formed to a thickness of about 3 μm through sputtering. The Si substrate 101 which has the piezoelectric body thin film 107 formed thereon is taken out from a sputtering device and then subjected to calcination at a temperature of 70020 C. in an oxygen atmosphere, to thereby crystallize the PZT film. At this time, the PZT film has a composition ratio of Pb(Zr; 0.52, Ti; 0.48)O3 in order to attain a satisfactory piezoelectric effect. However, the composition of the PZT film is not necessarily limited to the above-mentioned composition, and other compositions may also be adopted. Further, the thickness of the PZT film is not limited to 3 μm.

Next, on the piezoelectric body thin film 107, a Pt film is deposited to a thickness of 300 nm, which serves as a Pt electrode forming the upper electrode 108. After that, the piezoelectric body thin film 107 and the upper electrode 108 are processed through etching so as to correspond to each of the individual liquid chambers 102. A detailed description is given on how the piezoelectric body thin film 107 and the upper electrode 108 are processed, with reference to FIGS. 3A and 3B which show the individual liquid chambers 102 in a cross-sectional direction.

Figure 3A:
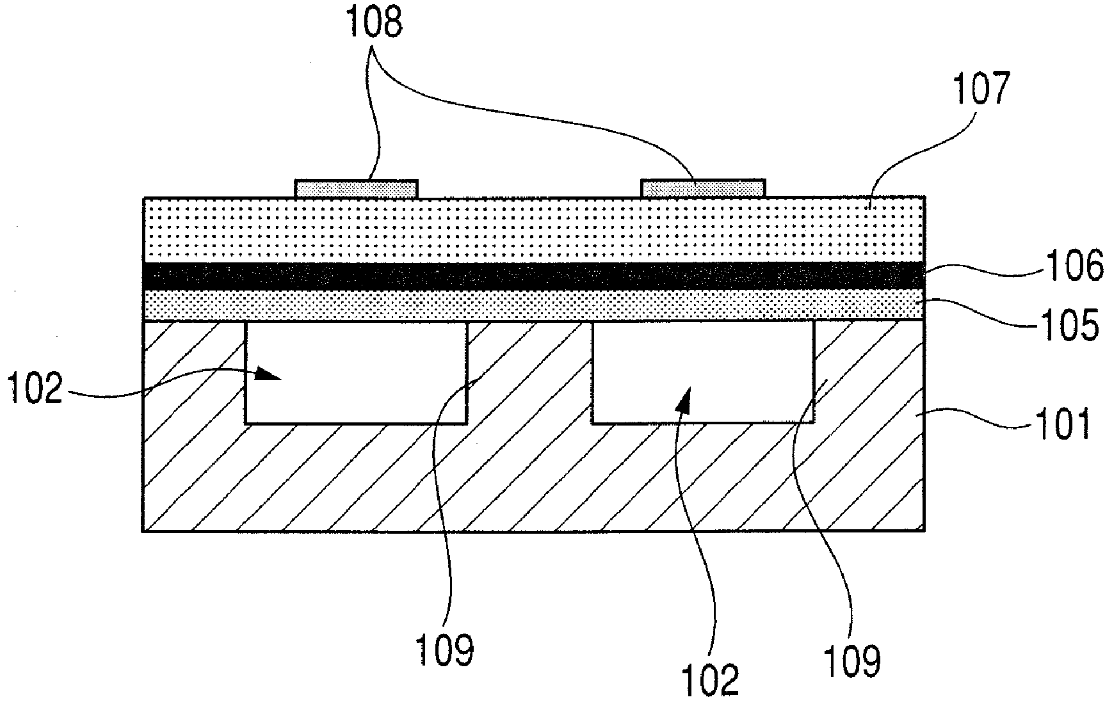
FIGS. 3A and 3B are transverse sectional views for illustrating how the piezoelectric thin film is etched in the ink jet head according to the first embodiment.

First, on the upper electrode 108, a photoresist is applied and patterned, through which a Pt film is removed from a region which does not correspond to the individual liquid chamber 102 through dry etching using gas such as BC13 (refer to FIG. 3A). The upper electrode 108 may also be processed through another method such as Ar ion milling, rather than through dry-etching using BC13 gas. Also, according to this embodiment, the upper electrode 108 is formed to have a length of 3 mm in a longitudinal direction, but the size of the upper electrode 108 is not limited thereto.

Figure 3B:
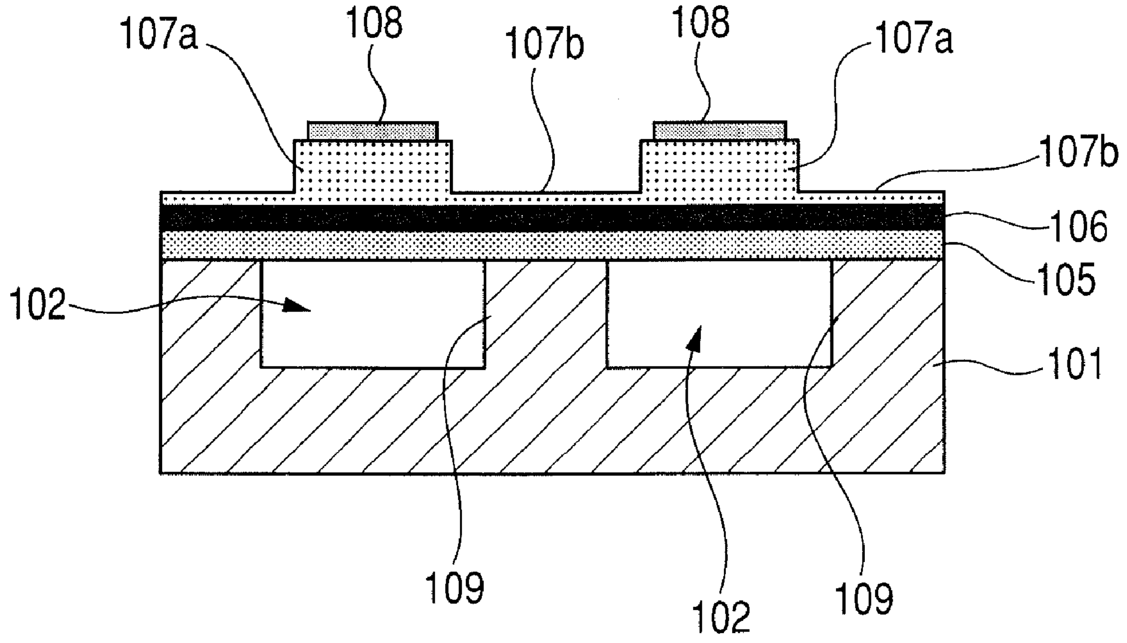

Next, a photoresist is again applied and patterned on the upper electrode 108 which has a resist pattern width a little wider than the width of the upper electrode 108 so as to cover the upper electrode 108, and the piezoelectric body thin film 107 is partially removed through etching using a chlorine-based gas (refer to FIG. 3B). According to this embodiment, the piezoelectric body thin film 107 is dry etched by using mixed gas of C12 and CF4. The PZT film forming the piezoelectric body thin film 107 is relatively stable in etching rate, and therefore it is possible to control an etching amount of the piezoelectric body thin film 107 by regulating an etching time. In this embodiment, the piezoelectric body thin film 107 is etched such that the piezoelectric body thin film 107 has a thickness of about 0.5 μm at least at a region corresponding to the partition wall 109. Further, in order to further reduce the difference in etching rate in an in-plane direction of the piezoelectric body thin film 107 due to the difference in pattern shape, an excessive dummy resist pattern may be provided on the sides of the elements at both ends which are used for actual driving.

The piezoelectric body thin film 107 is not completely removed through etching in a film-thickness direction. The piezoelectric body thin film 107 still remains as a piezoelectric body thin film 107*b* on the lower electrode 106 having a reduced thickness of about 0.5 μm. In other words, according to this embodiment, the lower electrode 106 is prevented from being exposed and etched. Therefore, according to this embodiment, components of the lower electrode 106 or the like do not adhere to an end surface of a piezoelectric body thin film 107*a*, thereby enabling to prevent leakage or breakage from occurring. Further, the lower electrode 106 is covered by the piezoelectric body thin film 107*b* at a portion in the proximity of the individual liquid chamber 102, thereby enabling to significantly suppress the occurrence of leakage between the upper electrode 108 and the lower electrode 106 or breakage of the piezoelectric element.

It can be considered that part of the piezoelectric body thin film 107 remaining as the piezoelectric body thin film 107*a* with a film thickness of 3 μm after etching corresponds to an area which actually contributes to driving. On the partition wall 109, the piezoelectric body thin film 107 having a film thickness of about 0.5 μm is provided, which is considered to become a factor responsible for hindering displacement of the piezoelectric body thin film 107 as a whole. However, the displacement amount in this embodiment was different only by 5% from that in a structure where the piezoelectric body thin film 107*b* corresponding to the portion above the partition wall 109 does not exist, that is, a case where the piezoelectric body thin film 107 is completely etched away through its thickness of 3 μm. Accordingly, the piezoelectric body thin film 107*b* corresponding to the portion above the partition wall 109 does not affect the displacement as long as the piezoelectric body thin film 107*b* is provided in thickness of about 0.5 μm, and a sufficient displacement amount can be obtained.

Further, studies have been made regarding a reduction in the displacement amount with respect to the film thickness of the piezoelectric body thin film 107*b* corresponding to the portion above the partition wall 109. The result of the studies indicates that the displacement amount is reduced only by 15% even in a case where the film thickness of the piezoelectric body thin film 107*a* is 3 μm and the film thickness of the piezoelectric body thin film 107*b* is 1 μm, that is, a case where the piezoelectric body thin film 107 is removed by a film thickness of 2 μm to leave the piezoelectric body thin film 107 with a film thickness of 1 μm. From the viewpoint of the variation in the etching rate in an in-plane direction of the piezoelectric body thin film 107 and the reduction in the displacement amount, it is desirable to leave, without removing through etching, the piezoelectric body thin film 107*b* to a film thickness of about 1 μm in maximum.

According to the structure of this embodiment, the lower electrode 106 is taken out through a take-out portion provided to a position away from the individual liquid chamber 102. To form the take-out portion of the lower electrode 106, the piezoelectric body thin film 107 is completely removed to all the film thickness of 3 μm through etching.

Lastly, on the reverse side of the Si substrate 101, an orifice plate 111 is bonded, to thereby complete the creation of an ink jet head using the piezoelectric body thin film 107 as shown in FIG. 1. The orifice plate 111 may be formed by processing a Si wafer through ICP or by subjecting a stainless steel (SUS) plate to punching processing.

As described above, according to this embodiment, part of the piezoelectric body thin film 107 exists on the lower electrode 106, and therefore it is possible to prevent the lower electrode 106 from being etched in the etching processing and the etched component of the lower electrode 106 from adhering to the edge portion of the piezoelectric body thin film 107. Also, in the ink jet head according to this embodiment, the lower electrode 106 is covered by part of the piezoelectric body thin film 107 which serves as an insulator, thereby preventing the upper and lower electrodes 108 and 106 from being short-circuited and the piezoelectric body thin film 107 from being damaged.

Also, according to this embodiment, the piezoelectric body thin film 107 is partially removed in a film-thickness direction through dry etching, thereby enabling to process the piezoelectric body thin film 107 to a desired shape with high accuracy.

In this embodiment, the constituent member of the individual liquid chamber 102 or the orifice plate 111 is formed of Si, and the vibrating plate 105 is made of glass. However, the present invention is not limited to this, and any other material or manufacturing method may also be adopted to create the individual liquid chamber 102, the orifice plate 111, or the vibrating plate 105.

Second Embodiment

Next, an ink jet head according to a second embodiment will be described.

Figure 4:
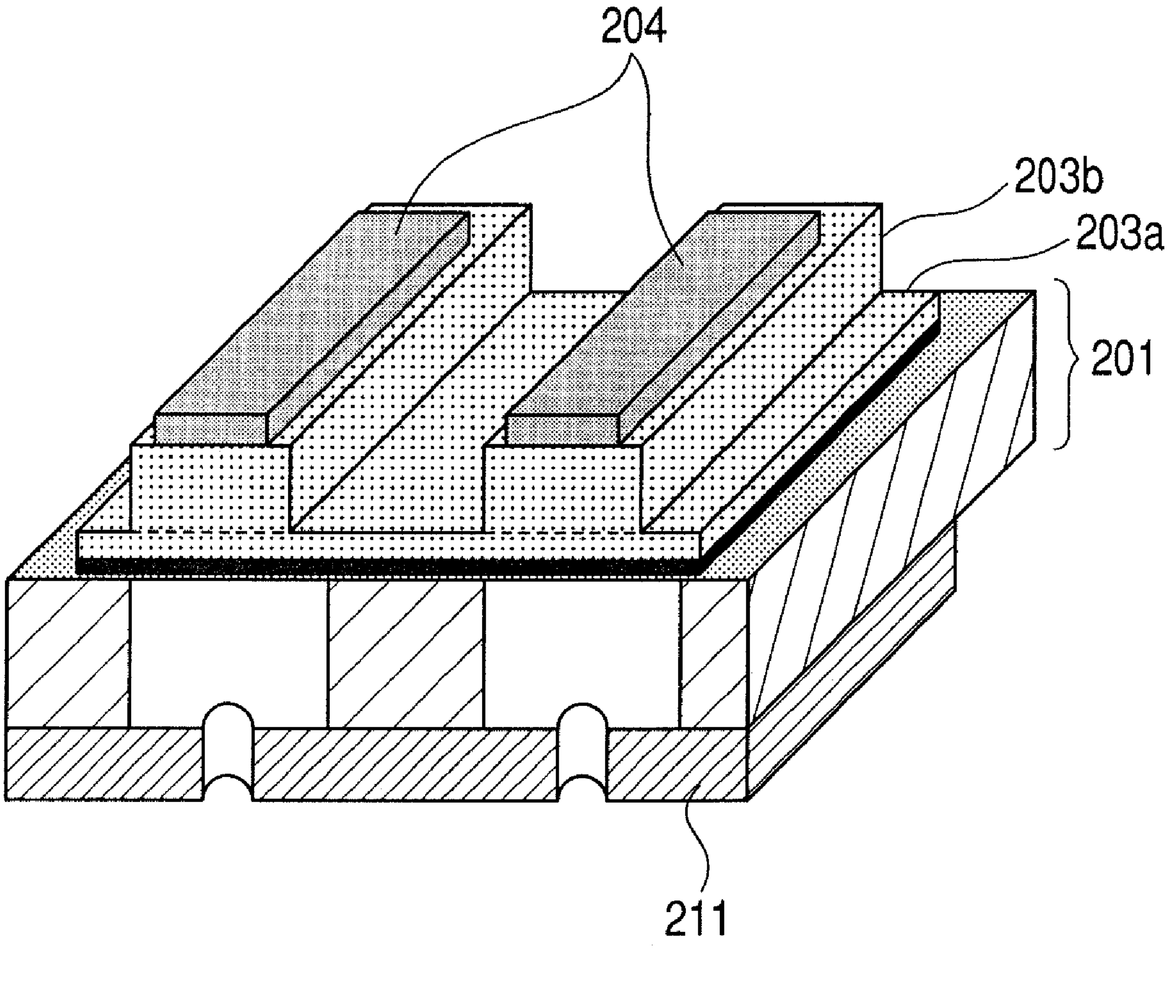
FIG. 4 is a perspective view illustrating a structure of an ink jet head according to a second embodiment of the present invention.

As shown in FIG. 4, an ink jet head according to a first embodiment includes an orifice plate 211 having a discharge port for discharging ink and a silicon-on-insulator (SOI) wafer 201 bonded to the orifice plate 211. The SOI wafer 201 includes a plurality of individual liquid chambers which communicate with the discharge port and apply pressure to ink, and a partition wall for isolating each of the individual liquid chambers.

The SOI wafer 201 is provided with a piezoelectric element serving as a pressure generator unit. The piezoelectric element is formed by including a lower electrode 202, a piezoelectric body thin film 203, and an upper electrode 204 which are sequentially laminated on the SOI wafer 201 in the stated order. Also, in this embodiment, the piezoelectric body thin film 203 has a laminated structure of a piezoelectric body thin film upper portion 203*b* and a piezoelectric body lower portion 203*a*.

The piezoelectric body thin film 203 is formed of regions corresponding to centers of the individual liquid chambers and a region corresponding to the partition wall. The film thickness of the piezoelectric body thin film lower portion 203*b* located at a region corresponding to the partition wall is smaller than the film thickness of the piezoelectric body thin film upper portion 203*a* located at the regions corresponding to the centers of the individual liquid chambers.

A method of manufacturing the ink jet head structured as described above will be described.

Figure 5A:
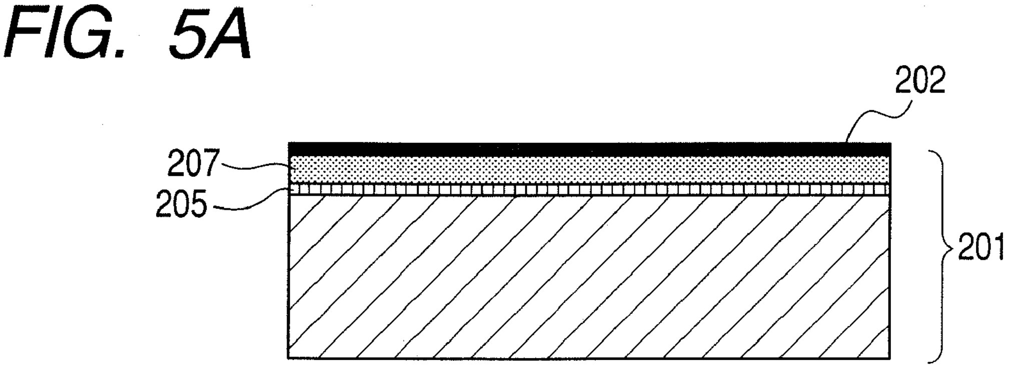
FIGS. 5A, 5B, 5C and 5D are transverse sectional views illustrating a piezoelectric body film deposited on a vibrating plate in the ink jet head according to the second embodiment.

As shown in FIG. 5A, on the SOI wafer 201 of 200 μm in thickness, an adhesion layer of Ti and a Pt film are deposited to thicknesses of 10 nm and 200 nm, respectively. After that, the piezoelectric body thin film 203 is formed on the lower electrode 202. Accordingly, the piezoelectric body thin film 203 includes two layers of the piezoelectric body thin film lower portion 203*a* and the piezoelectric body thin film upper portion 203*b* in a film-thickness direction.

Figure 5B:
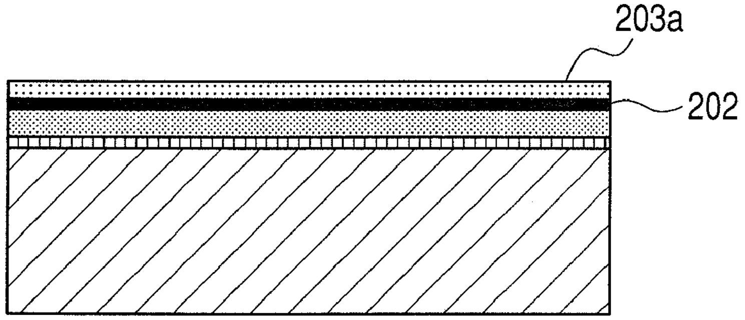
Figure 5C:
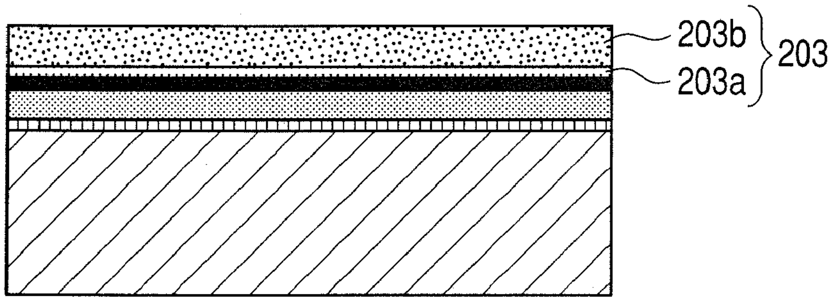

In the process of forming the piezoelectric thin film lower portion 203*a*, first, as shown in FIG. 5B, on the lower electrode 202, a Pb(Zr, Ti)O3 perovskite oxide (hereinafter, referred to as PZT) film formed of lead, titanium, and zirconium is deposited to a thickness of about 0.2 μm in thickness through sputtering. The SOI wafer 201 which has the PZT film formed on the lower electrode 202 is taken out from a sputtering device and then subjected to calcination at a temperature of 700° C. in an oxygen atmosphere so as to crystallize the PZT film, to thereby obtain a polycrystalline PZT film. At this time, the PZT film is set to have a composition ratio of Pb(Zr; 0.52, Ti; 0.48)O3 in order to attain a satisfactory piezoelectric effect. However, the composition of the PZT film is not necessarily limited to the above-mentioned composition, and other compositions may also be adopted. After that, as shown in FIG. 5C, the piezoelectric body thin film upper portion 203*b* is formed by depositing another PZT film to a thickness of 2.8 μm through sputtering.

Figure 5D:
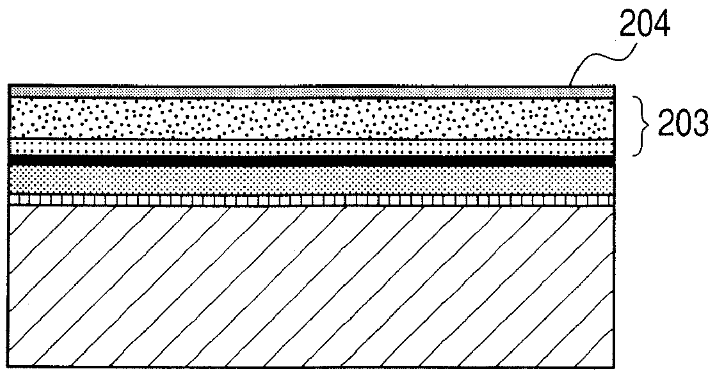

Next, as shown in FIG. 5D, on the piezoelectric body thin film upper portion 203*b*, a Pt film is deposited to a thickness of 200 nm, which serves as a Pt electrode forming the upper electrode 204. A Pt/Ti film may also be deposited as the upper electrode 204. In this case, Ti serves as an adhesion layer between the Pt film and the piezoelectric body thin film upper portion 203*b*.

Figure 6A:
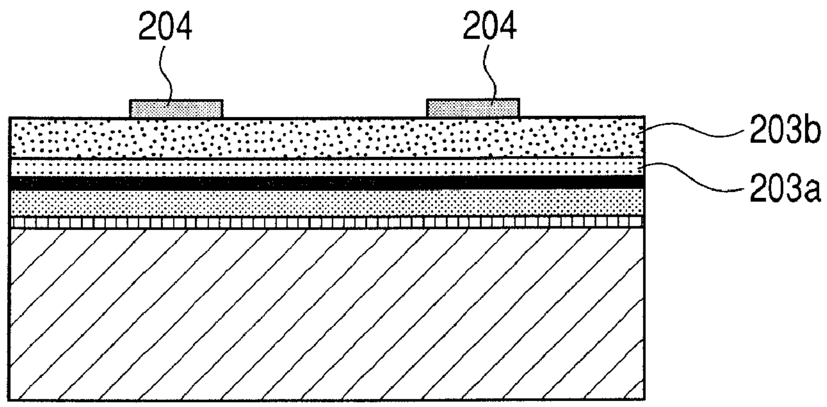
FIGS. 6A, 6B and 6C are transverse sectional views for illustrating how the piezoelectric body thin film is etched in the ink jet head according to the second embodiment.
Figure 6B:
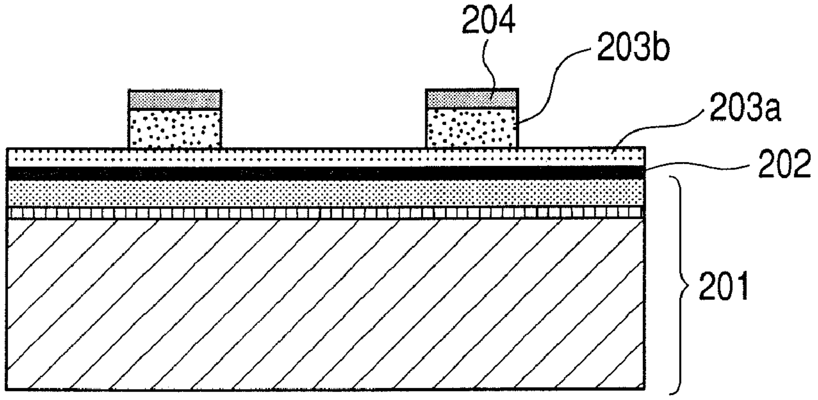
Figure 6C:
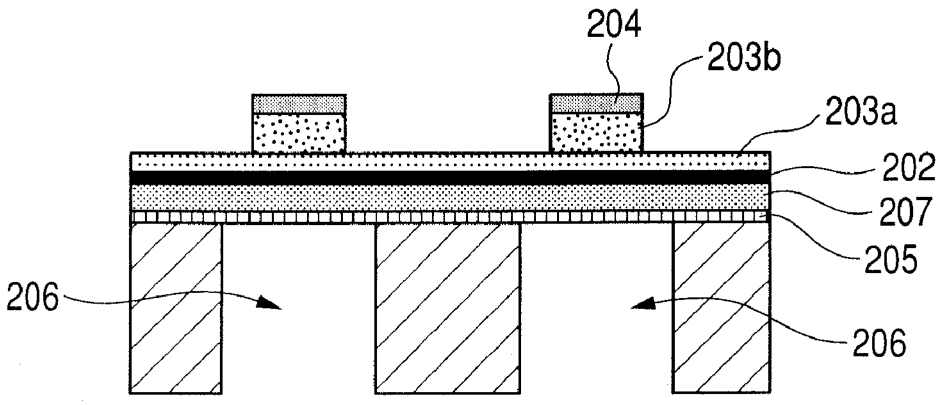

After that, the upper electrode 204 and the piezoelectric body thin film 203 are processed through etching. With reference to FIGS. 6A to 6C, a detailed description will be given on how the upper electrode 204 and the piezoelectric body thin film 203 are processed.

First, as shown in FIG. 6A, on the upper electrode 204, a photoresist is applied and patterned, through which a Pt portion is removed through dry etching using gas such as BC13. The upper electrode 204 may also be processed through another method such as Ar ion milling, rather than through dry etching using BC13 gas.

Next, as shown in FIG. 6B, the piezoelectric body thin film upper portion 203*b* is etched by using a chlorine-based gas. In this embodiment, a photomask which is used for forming the upper electrode 204 is used, through which the piezoelectric body thin film upper portion 203*b* is etched such that the piezoelectric body thin film upper portion 203*b* becomes equal to the upper electrode 204 in width. The photomask to be used for etching the piezoelectric body thin film upper portion 203*b* may be newly patterned through a resist so as to cover the upper electrode 204, to thereby obtain the photomask.

The piezoelectric body thin film upper portion 203*b* is relatively stable in etching rate, and therefore it is possible to control an etching amount of the piezoelectric body thin film upper portion 203*b* by regulating an etching time. Further, the piezoelectric body thin film lower portion 203*a*, which is crystallized, is etched at an etching rate lower than an etching rate at which the piezoelectric body thin film upper portion 203*b*, which is not crystallized, is etched. Accordingly, the piezoelectric body thin film lower portion 203*a* serves as an etching stop layer, with which the piezoelectric body thin film upper portion 203*b* can be etched with high accuracy.

Next, the SOI wafer 201 is again subjected to calcination at a temperature of 700° C. in an oxygen atmosphere so as to crystallize the PZT film on the piezoelectric body thin film upper portion 203*b* which has not been crystallized, to thereby obtain a polycrystalline PZT film. In order to attain a satisfactory piezoelectric effect, the PZT film is set to have a composition ratio of Pb(Zr; 0.52, Ti; 0.48)O3. However, the composition of the PZT film is not necessarily limited to the above-mentioned composition, and other compositions may also be adopted.

The piezoelectric body thin film 203 is not completely etched to be removed in the film thickness direction, and the piezoelectric body thin film lower portion 203*a* of about 0.2 μm in thickness remains on the lower electrode 202. In other words, in this embodiment, the lower electrode 202 is prevented from being exposed and etched. Therefore, according to this embodiment, it is possible to prevent a situation where components of the lower electrode 202 adhere to an end surface of the piezoelectric body thin film 203 when the piezoelectric body thin film 203 is being etched, leading to a short-circuit between the upper and lower electrodes 204 and 202. Further, the lower electrode 202 is covered by the piezoelectric body thin film 203 at a portion in the proximity of an individual liquid chamber 206, thereby enabling to suppress the occurrence of leakage between the upper electrode 204 and the lower electrode 202 or breakage thereof. Also, the piezoelectric body thin film 203 contacts with the lower electrode 202 over a large area, which makes the piezoelectric body thin film 203 resistant to peel-off.

This embodiment has a structure in which an uncrystallized PZT film is used for the unprocessed piezoelectric body thin film upper portion 203*b* and a crystallized PZT film is used for the piezoelectric body thin film lower portion 203*a*, however, the structure is not necessarily limited thereto. For example, there may also be adopted a structure in which a polycrystalline PZT film is used for the piezoelectric body thin film upper portion 203*b* and a monocrystalline PZT film is used for the piezoelectric body thin film lower portion 203*a*, a structure in which the polycrystalline PZT film and the monocrystalline PZT film are interchanged, or a structure in which a monocrystalline PZT film is used for both the piezoelectric body thin film upper portion 203*b* and the piezoelectric body thin film lower portion 203*a*. Further, the material for the piezoelectric body thin film 203 is not limited to the PZT film, and may include a barium titanium oxide or a zinc oxide.

After that, as shown in FIG. 6C, the SOI wafer 201 is etched from the reverse side thereof by using an oxide film 205 provided to the SOI wafer 201 as an etching stop layer, to thereby form the individual liquid chamber 206. The etching is performed by using an inductively coupled plasma (ICP) etching device, which is known for a deep reactive ion etching (DRIE) technology for Si. The SOI wafer 201 includes an Si monocrystalline portion which functions as a vibrating plate 207.

Lastly, on the reverse side of the SOI wafer 201, an orifice plate 211 is bonded, to thereby complete the creation of an ink jet head using the piezoelectric body thin film 203 as shown in FIG. 4. The orifice plate 211 may be formed by processing a Si substrate through ICP.

As described above, according to this embodiment, the piezoelectric body thin film 203 has a laminated structure of the piezoelectric body thin film upper portion 203*b* and the piezoelectric body thin film lower portion 203*a* which are different in etching rate in a film thickness direction. With this structure, the piezoelectric body thin film 203 can be etched in such a manner that the etching can be smoothly stopped from progressing in the middle of the etching process of the piezoelectric body thin film 203 before the piezoelectric body thin film 203 is completely etched through in a film thickness direction.

Also, according to this embodiment, in the piezoelectric body thin film 203, the piezoelectric body thin film lower portion 203*a* serves as an etching stop layer and the piezoelectric body thin film upper portion 203*b* is partially etched. At this time, the piezoelectric body thin film upper portion 203*b* can be etched with high accuracy because the piezoelectric body thin film upper portion 203*b* is different in etching rate from the piezoelectric body thin film lower portion 203*a*.

Also, according to this embodiment, the piezoelectric body thin film 203 includes, before being etched, the piezoelectric body thin film upper portion 203*b* in a pre-crystallized state and the piezoelectric body thin film lower portion 203*a* in a crystallized state. Accordingly, it is easy to form, in the piezoelectric body thin film 203, a portion which is relatively high in etching rate and a portion which is relatively low in etching rate in the film thickness direction of the piezoelectric body thin film 203.

Also, according to this embodiment, the piezoelectric body thin film upper portion 203*b* is crystallized after the etching process of the piezoelectric body thin film 203, thereby enabling to form the piezoelectric body thin film 203 having a desired piezoelectric effect.

Note that, in this embodiment, an SOI wafer is used as a member for forming the individual liquid chamber 206 and the vibrating plate 207, and a Si substrate is used as the orifice plate 211, however, the present invention is not limited thereto, and any other wafer or another manufacturing method can also be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-243986 filed Sep. 8, 2006, which is hereby incorporated by reference herein in its entirety.

What is claimed is:

1. A method of manufacturing a liquid discharge head comprising a plurality of liquid chambers for pressurizing a liquid, the plurality of liquid chambers communicating with respective discharge ports, and a plurality of piezoelectric elements provided in correspondence with the plurality of liquid chambers, respectively, the plurality of piezoelectric elements each including a lower electrode, a first piezoelectric body film, a second piezoelectric body film, and an upper electrode, which are sequentially layered in the listed order from a side of the plurality of liquid chambers, the lower electrode being provided at least at a region corresponding to a portion between two of the plurality of liquid chambers, the first piezoelectric body film completely covering at least the lower electrode provided at the region, the method of manufacturing the liquid discharge head comprising:

forming a first material film for forming the first piezoelectric body film on the lower electrode;

forming a second material film for forming the second piezoelectric body film on the first material film, the first material film and the second material film being different from each other in etching rate in a film thickness direction; and etching the second material film at the region by using the first material film as an etching stop layer.

2. A method of manufacturing a liquid discharge head according to claim 1, wherein:

the etching of the second material film comprises dry-etching the second material film; and the lower electrode comprises Pt.

3. A method of manufacturing a liquid discharge head according to claim 1, wherein the second material film to be etched is in a pre-crystallized state, and the first material film to serve as the etching stop layer is in a crystallized state.

4. A method of manufacturing a liquid discharge head according to claim 3, further comprising crystallizing the first material film in a pre-crystallized state, which follows the forming of the first material film.

* * * * *